United States Patent
Gonzalez Gillis et al.

(10) Patent No.: US 11,759,866 B2
(45) Date of Patent: Sep. 19, 2023

(54) MODULAR ADDITIVE MANUFACTURED TOOL ASSEMBLY

(71) Applicant: GM GLOBAL TECHNOLOGY OPERATIONS LLC, Detroit, MI (US)

(72) Inventors: Gabriel Gonzalez Gillis, Windsor (CA); Paul Tanis, Oxford, MI (US); Robert C. Portugaise, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 271 days.

(21) Appl. No.: 17/126,303

(22) Filed: Dec. 18, 2020

(65) Prior Publication Data

US 2022/0193789 A1 Jun. 23, 2022

(51) Int. Cl.
*B23B 29/04* (2006.01)
*B23Q 11/10* (2006.01)
*B33Y 80/00* (2015.01)

(52) U.S. Cl.
CPC .......... *B23B 29/04* (2013.01); *B23Q 11/1023* (2013.01); *B23B 2231/24* (2013.01); *B33Y 80/00* (2014.12)

(58) Field of Classification Search
CPC ......... B23B 29/12; B23B 51/06; B23B 51/10; B23B 51/068; B23B 51/0682; B23B 51/0684; B23B 51/0686; B23C 5/26; B23C 5/28; B23Q 11/1023; B33Y 88/00; B33Y 99/00
See application file for complete search history.

(56) References Cited

U.S. PATENT DOCUMENTS

| | | | |
|---|---|---|---|
| 5,609,446 A | 3/1997 | Link et al. | |
| 5,711,492 A * | 1/1998 | Cheladze | B02C 18/182 241/300 |
| 7,156,589 B2 * | 1/2007 | Sugata | B23Q 11/1023 408/59 |
| 9,533,393 B2 * | 1/2017 | Haimer | B23Q 11/1061 |
| 10,814,447 B2 * | 10/2020 | Gosselin | B23B 31/4073 |
| 10,857,599 B2 * | 12/2020 | Marchione | B23B 27/007 |
| 2016/0332236 A1 * | 11/2016 | Stoyanov | C22C 29/08 |
| 2018/0369976 A1 | 12/2018 | Gosselin et al. | |

FOREIGN PATENT DOCUMENTS

EP 3791980 A1 * 3/2021 ........... B23B 31/305
KR 20160050372 A * 5/2016

OTHER PUBLICATIONS

Oldspy1323, Oct. 28, 2020, Paint stir drill bit, https://www.thingiverse.com/make:860492 (Year: 2020).*

* cited by examiner

*Primary Examiner* — Alan Snyder
*Assistant Examiner* — Reinaldo A Vargas Del Rio
(74) *Attorney, Agent, or Firm* — Vivacqua Crane PLLC

(57) ABSTRACT

A modular additive manufactured tool assembly includes a perishable tool and a tool holder coupled to the perishable tool. The tool assembly is configured to be coupled to a machine spindle. The tool assembly also includes a spindle connection coupled to the tool holder. The spindle connection is configured to be coupled to a machine spindle. Each of the tool holder and the perishable tool includes a perishable material. Each of the tool holder and the perishable tool is manufactured using an additive manufacturing process.

18 Claims, 5 Drawing Sheets

MODULAR ADDITIVE MANUFACTURED TOOL ASSEMBLY

TECHNICAL FIELD

The present disclosure generally relates to tools and, more particularly, to a modular additive manufactured tool assembly including a tool holder for holding an additive manufactured tool.

INTRODUCTION

The present disclosure describes a modular additive manufactured tool assembly including a tool holder and a tool manufactured using one or more additive manufacturing processes. The tool assembly also includes a spindle connector that is capable of automatic operation in production equipment and that includes necessary hardware, such as chip reader and coolant tube.

Validation of machine process equipment is sometimes costly and time consuming. It is therefore desirable to develop assemblies and methods for validating machined processes in a timely and cost-effective manner. The presently disclosed tool assembly uses additive manufacturing technology to reduce the total time required for validation of machining process equipment while doing so at a reduced cost. This intends to enable generating via additive manufacturing methods prototypes tools and tool assemblies that can be quickly deployed to support equipment validation.

In other machining process, the tool holder may be produced with different materials, tolerances and build quality acceptable for a validation run/process validation; however, the spindle connection should be built according to specific standards for material, precision finishing, and function. Therefore, these other machining processes are time consuming and expensive.

The presently disclosed tool assembly provides a solution for a connection between the tool holder and the spindle connection using additive manufacturing technology. The presently disclosed tool assembly also provides internal and external support and growth control components, as well as test measuring and/or indicating devices needed to perform a complete validation process. Thus, the presently disclosed tool assembly allows the user to move the validation phase for equipment and machining process (motions, programs, collision interferences, etc.) to be done in parallel with, or even ahead of start of, cutting tool production. This can significantly reduce the overall equipment validation timeline and reduce added expense of using production cutting tools during validation.

In an aspect of the present application, the modular additive manufactured tool assembly includes a perishable tool and a tool holder coupled to the perishable tool. The tool assembly is configured to be coupled to a machine spindle. The tool assembly further includes a spindle connection coupled to the tool holder. The spindle connection is configured to be coupled to a machine spindle. Each of the tool holder and the perishable tool includes a perishable material. Each of the tool holder and the perishable tool is manufactured using an additive manufacturing process. The spindle connection may include a connection locating feature, and the tool holder may include a holder locating feature shaped and sized to mate with the connection locating feature.

The tool assembly may further include a longitudinal support coupled between the spindle connection and the tool holder. The longitudinal support may include a metallic material. The perishable material may include a polymeric material. The metallic material has a first bending stiffness, and the perishable material has a second bending stiffness. The term "perishable tool" means a tool that is incapable of machining a metallic workpiece and rapidly wears and breaks when machining the metallic workpiece. The first bending stiffness may be greater than the second bending stiffness to minimize bending of the tool holder. Each of the tool holder and the perishable tool includes a plurality of layers of the perishable material. The term "perishable material" means a material that rapidly wears and breaks when used to machine a metallic workpiece.

The tool holder may include an elongated body. The tool holder may define a reinforcement opening extending through the elongated body. The longitudinal support may be a metallic bar disposed in the reinforcement opening.

The tool holder may define an outermost holder surface and an innermost holder surface opposite the outermost holder surface. The innermost holder surface may define the reinforcement opening. The tool assembly further comprises a radial support disposed around the tool holder. The radial support is in direct contact with the outermost holder surface. The radial support may include the metallic material. The radial support is a collar disposed around the tool holder to minimize radial expansion of the tool holder.

The tool assembly may further include at least one fastener coupling the spindle connection to the tool holder. The tool assembly may further include a cooling nozzle extending through the perishable tool, wherein the cooling nozzle is configured to receive a coolant to simulate thru-tool coolant flow/direction/machine. The tool assembly may further include at least one bleed hole extending through the spindle connection to adjust coolant flow/properties. The tool holder includes a first holder end portion and a second holder end portion opposite the first holder end portion. The second holder end portion may include the holder locating feature. The connection locating feature may be a connection opening sized and shaped to receive the second holder end portion. The tool holder may include a tool holder opening extending through the first holder end portion, and the tool holder opening may be sized and shaped to receive a portion of the perishable tool to connect the perishable tool to the tool holder. The tool assembly may further include a flange disposed around the tool holder. The flange directly abuts the spindle connection. The flange may be in direct contact with the spindle connection and surrounds the second holder end portion of the tool holder to facilitate connecting the spindle connection to the tool holder.

The present disclosure also describes a method of validating a predetermined machining plan. In an aspect of the present disclosure, the method includes: manufacturing a perishable tool using an additive manufacturing process; manufacturing a tool holder using the additive manufacturing process, wherein each of the perishable tool and the tool holder is made of a perishable material; connecting the tool holder to a spindle connection; connecting the perishable tool to the tool holder; connecting the spindle connection to a machine spindle; and simulating machining a workpiece with the perishable tool after connecting the perishable tool to the tool holder and after connecting the spindle connection to the machine spindle in accordance with the predetermined machining plan to validate the predetermined machining plan. Simulating machining is performed using a finished part and the tool assembly running a cycle program in computer numerical control (CNC).

Simulating machining the workpiece may entail milling, boring, and/or drilling the workpiece in accordance with the predetermined machining plan. The method may further include placing a longitudinal support between the spindle connection and the tool holder. The longitudinal support may be wholly made of a metallic material. The perishable material may be a polymeric material. Each of the tool holder and the perishable tool may be wholly made of the polymeric material. The metallic material has a first bending stiffness, and the perishable material has a second bending stiffness. The first bending stiffness may be greater than the second bending stiffness to minimize bending of the tool holder. The tool holder may include an elongated body. The tool holder may define a reinforcement opening. The reinforcement opening may extend through the elongated body. Placing the longitudinal support between the spindle connection and the tool holder may entail placing the longitudinal support in reinforcement opening of the tool holder. The longitudinal support may be a metallic bar.

The method may further include placing a radial support around the tool holder. The tool holder may define an outermost holder surface and an innermost holder surface opposite the outermost holder surface. The innermost holder surface may define the reinforcement opening. The radial support may be in direct contact with the outermost holder surface. The radial support may be wholly made of the metallic material. The radial support may be a collar configured to be disposed around the tool holder to minimize radial expansion of the tool holder.

The tool holder may include a first holder end portion and a second holder end portion opposite the first holder end portion. The tool holder may include a tool holder opening extending through the first holder end portion. The tool holder opening may be sized and shaped to receive a portion of the perishable tool to connect the perishable tool to the tool holder. Connecting the perishable tool to the tool holder may include inserting the portion of the perishable tool inside the tool holder opening of the first holder end portion to connect the perishable tool to the tool holder. Connecting the tool holder to the spindle connection may entail inserting the second holder end portion in a connection opening of the spindle connection, and the connection opening sized and shaped to receive the second holder end portion to connect the spindle connection to the tool holder. Machining workpiece may include simulating machining on the workpiece, wherein the workpiece has already been machined in accordance with the predetermined machine plan, and workpiece is wholly made of a material that is harder than a material forming the perishable tool The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
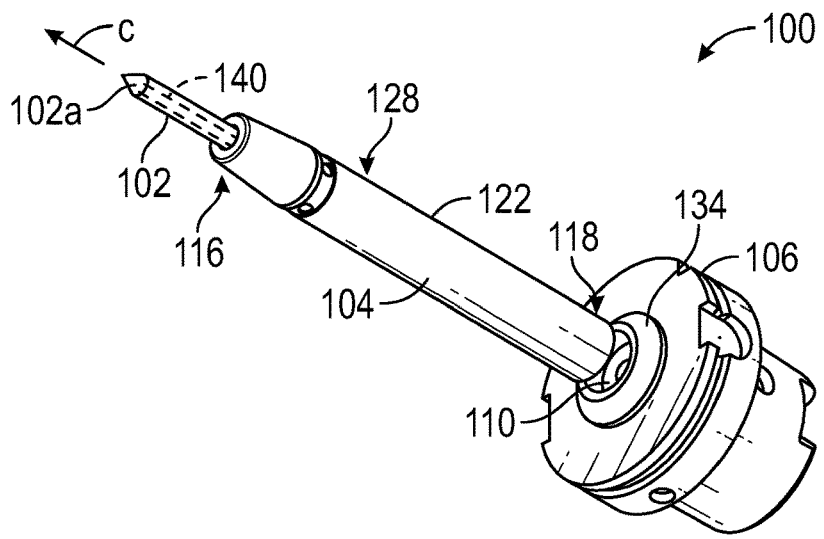
FIG. 1 is a perspective view of a modular additive manufactured tool assembly.
Figure 2:
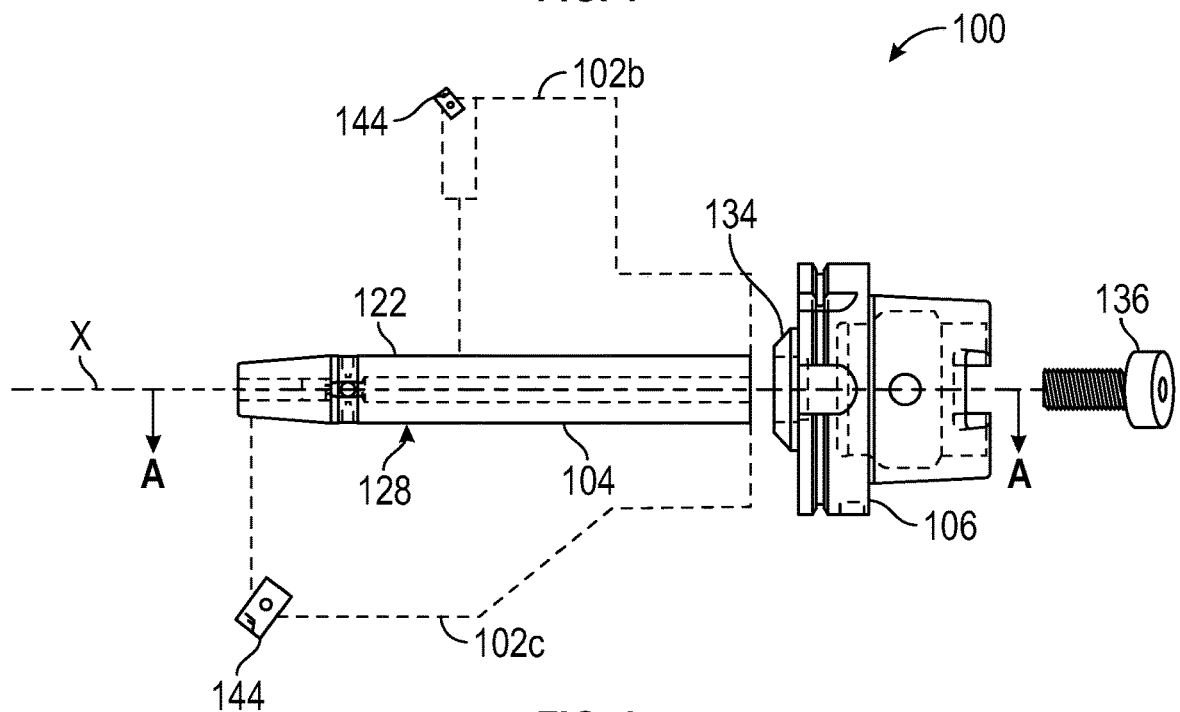
FIG. 2 is a side view of the modular additive manufactured tool assembly of FIG. 1.
Figure 3:
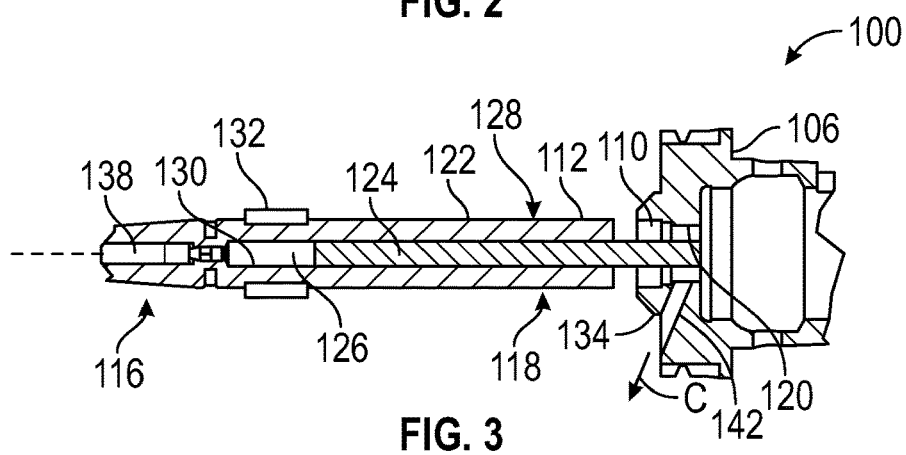
FIG. 3 is a cross-sectional view of the modular additive manufactured tool assembly of FIG. 1, taken along section A-A of FIG. 2.

With reference to FIG. 1, a modular additive manufactured tool assembly 100 can be used to validate a manufacturing process in a cost effective manner. For this reason, the tool assembly includes a perishable tool 102 and a tool holder 104 each wholly or partly made of a perishable material. The perishable material may be a polymeric material. Accordingly, the perishable tool 102 and the tool holder 104 are wholly or partially made of a polymeric material. To simplify manufacturing, each of the tool holder 104 and the perishable tool 102 may be made using an additive manufacturing process, such as 3D printing. During the additive manufacturing process, layers of the perishable material are added to form the tool holder 104 and/or the perishable tool 102. Accordingly, each of the perishable tool 102 and the tool holder 104 includes a plurality of layers of the perishable material. The tool assembly 100 further includes a spindle connection 106 configured to be connected to a machine spindle 108 (FIG. 4) of a machine. For this reason the machine spindle 108 is not made of a perishable material. For example, the spindle connection 106 may be wholly or partly made of a metallic material.

The tool holder 104 is configured to hold the perishable tool 102. In an assembled configuration, the tool holder 104 is directly coupled to the perishable tool 102, and the spindle connection 106 is directly coupled to the tool holder 104. To do so, the spindle connection 106 includes a connection locating feature 110, and the tool holder 104 includes a holder locating feature 112 shaped and sized to mate with the connection locating feature 110 to connect the spindle connection 106 to the tool holder 104. The tool holder 104 includes a first holder end portion 116 and a second holder end portion 118 opposite the first holder end portion 116. The second holder end portion 118 includes the holder locating feature 112. The connection locating feature 110 may be a connection opening 120 sized and shaped to receive the second holder end portion 118, which serves as the holder locating feature 112.

The tool holder 104 includes an elongated body 122 extending along a longitudinal axis X. The tool holder 104 defines a reinforcement opening 126 extending through the elongated body 122 along the longitudinal axis X. The tool assembly 100 further includes a longitudinal support 124 coupled between the spindle connection 106 and the tool holder 104. The longitudinal support 124 may be at least partially disposed in the reinforcement opening 126 of the tool holder 104 and may be configured as a metallic bar. Regardless of its configuration, the longitudinal support 124 may be partly or wholly made of a metallic material to minimize bending of the tool holder 104. This metallic material has a bending stiffness (i.e., the first bending stiffness) than is greater than the bending stiffness (i.e., second bending stiffness) of the perishable material (e.g., polymeric material) forming the tool holder 104 to minimize the bending of the tool holder 104 while allowing the tool holder 104 to be made of the perishable material to minimize costs. The tool holder 104 has an outermost holder surface 128 and an innermost holder surface 130 opposite the outermost holder surface 128. The innermost holder surface 130 defines the reinforcement opening 126.

The tool assembly 100 further includes a radial support 132 to minimize radial expansion of the tool holder 104 during use. The radial support 132 is disposed around the tool holder 104. For instance, the radial support 132 may be in direct contact with the outermost holder surface 128 of the tool holder 104 to minimize radial expansion. The radial support 132 may be configured as a collar and may be wholly or partly made of a metallic material. The bending stiffness of the metallic material forming the radial support 132 may be greater than the polymeric material forming the tool holder 104 to minimize radial expansion of the tool holder 104 during the use.

The tool assembly 100 further includes a flange 134 disposed around the tool holder 104. The flange 134 abuts (and may be in direct contact with) the spindle connection 106 to facilitate the connection between the spindle connection 106 or may be integrally coupled to the spindle connection 106, thereby forming a one-piece structure to minimize part count. The flange 134 may surround the second holder end portion 118 of the tool holder 104. The flange 134 may extent farther into the spindle connection 106 to allow the tool holder 104 to fit inside for longer and thus provide support.

The tool assembly 100 also includes one or more fasteners 136, such as bolts, connecting the spindle connection 106 to the tool holder 104. To this end, the fastener(s) 136 may be inserted through the spindle connection 106 and the tool holder 104.

Figure 4:
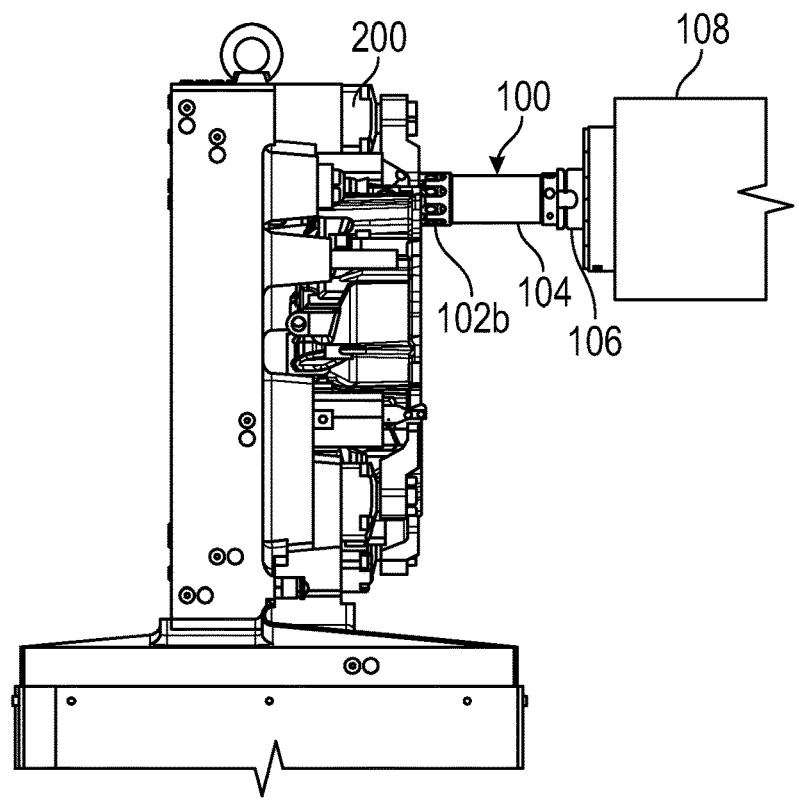
FIG. 4 is a side view of the modular additive manufactured tool assembly of FIG. 1 attached to a machine spindle and performing a milling operation on workpiece.

As discussed above, the tool assembly 100 includes the perishable tool 102, which may be a drill 102a, a mill 102b, a boring bar 102c, a reamer, taps, or another tool suitable to machine a workpiece 200 (FIG. 4). The perishable tool 102 is manufactured using an additive manufacturing process, such as 3D printing, and is wholly or partly made of a perishable material, such as a polymeric material. The tool assembly 100 may include position evaluation devices 144, such as markers or position sensors, attached to the perishable tool 102 (e.g., mill 102b or boring bar 102c) to determine the position of the perishable tool 102.

The tool holder 104 may include a tool holder opening 138 sized and shaped to partially receive the perishable tool 102 to connect the perishable tool 102 to the tool holder 104. The perishable tool 102 may have a cooling nozzle 140 configured to receive and deliver a coolant C to the workpiece to verify flow/targeting the workpiece 200 (FIG. 4) and the perishable tool 102, thereby maximizing the life of the perishable tool 102. The coolant C may be water, oil, MLQ (air droplets) or another suitable fluid. The spindle connection 106 may have bleed holes 142 extending therethrough for cooling the spindle connection 106.

Figure 5:
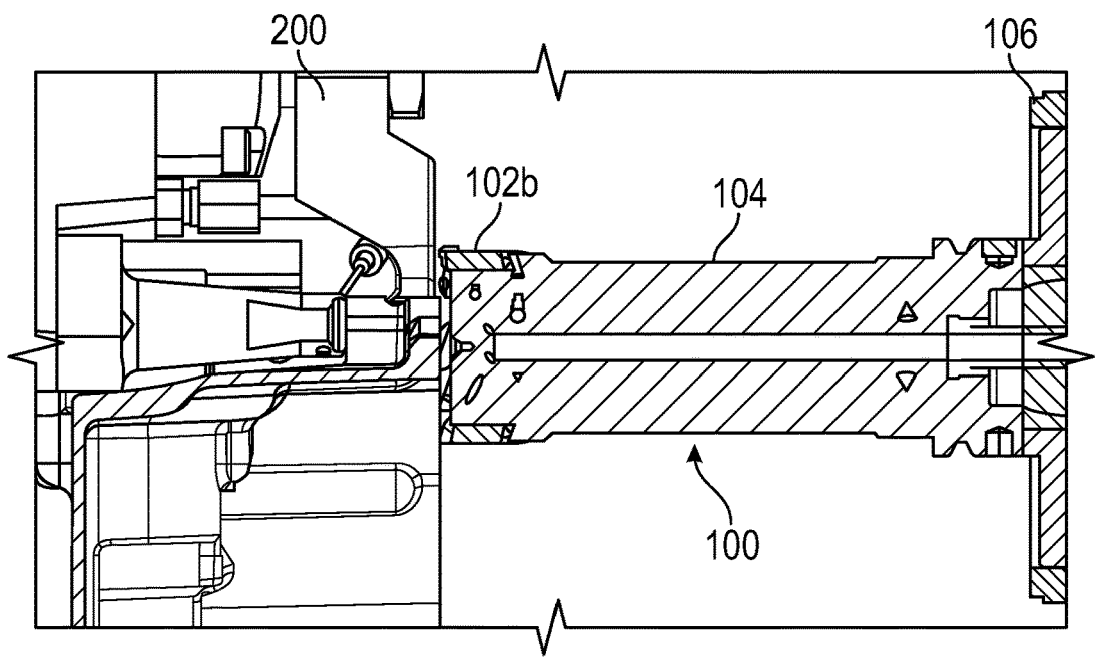
FIG. 5 is an enlarged, cross-sectional side view of the modular additive manufactured tool assembly of FIG. 1 attached to the machine spindle and performing a milling operation on workpiece.

With reference to FIGS. 4 and 5, the perishable tool 102 may be the mill 102b. The mill 102b is coupled to the tool holder 104, and the tool holder 104 is coupled to the spindle connection 106. The spindle connection 106 is coupled to the machine spindle 108. The mill 102b is perishable and made of a polymeric material so that it does not damage the workpiece during the validation of the manufacturing process. Validation entails testing the manufacturing process (e.g., testing the movement of the perishable tool 102) to ensure that the workpiece 200 is machined in accordance with predetermined specifications.

Figure 6:
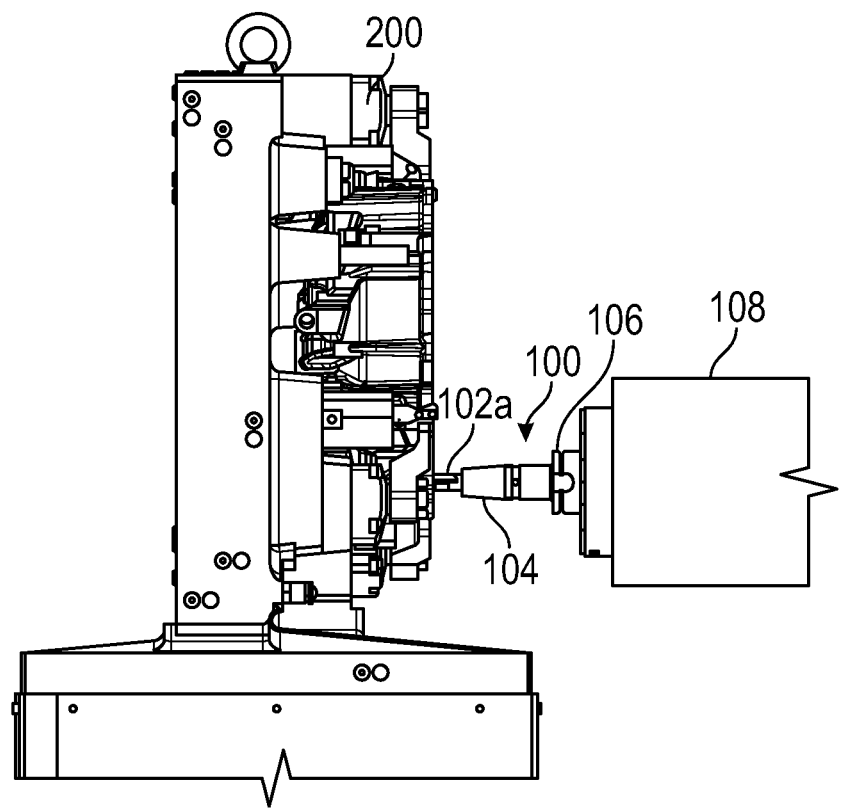
FIG. 6 is a side view of the modular additive manufactured tool assembly of FIG. 1 attached to a machine spindle and performing a drilling operation on workpiece.
Figure 7:
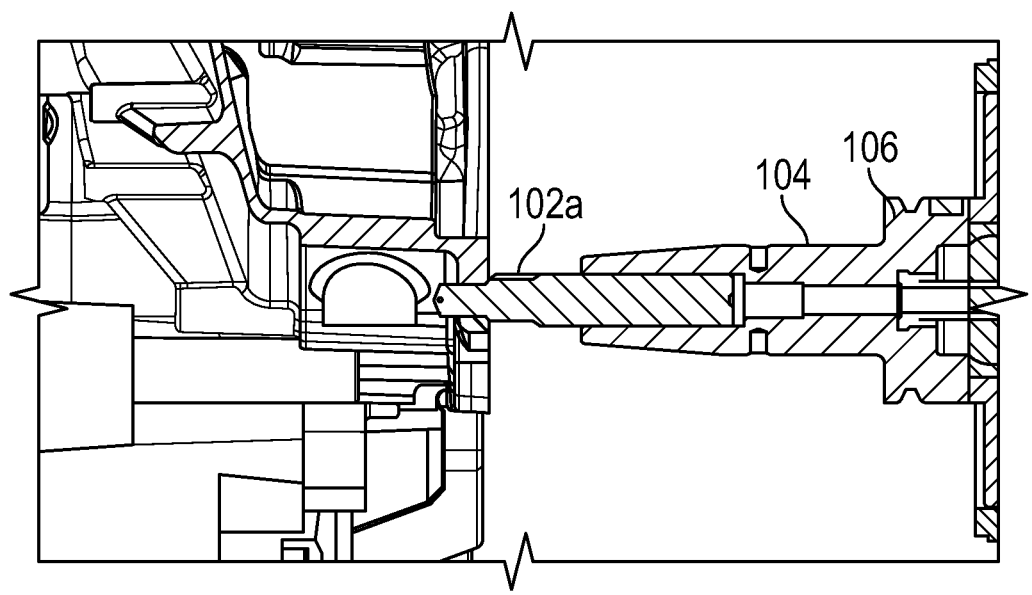
FIG. 7 is an enlarged, cross-sectional side view of the modular additive manufactured tool assembly of FIG. 1 attached to the machine spindle and performing a drilling operation on workpiece.

With reference to FIGS. 6 and 7, the perishable tool 102 may be the mill 102b. The mill 102b is coupled to the tool holder 104, and the tool holder 104 is coupled to the spindle connection 106. The spindle connection 106 is coupled to the machine spindle 108. The mill 102b is perishable and made of a polymeric material so that it does not damage the workpiece during the validation of the manufacturing process. Validation entails testing the manufacturing process (e.g., testing the movement of the perishable tool 102) to ensure that the workpiece 200 is machined in accordance with predetermined manufacturing specifications.

Figure 8:
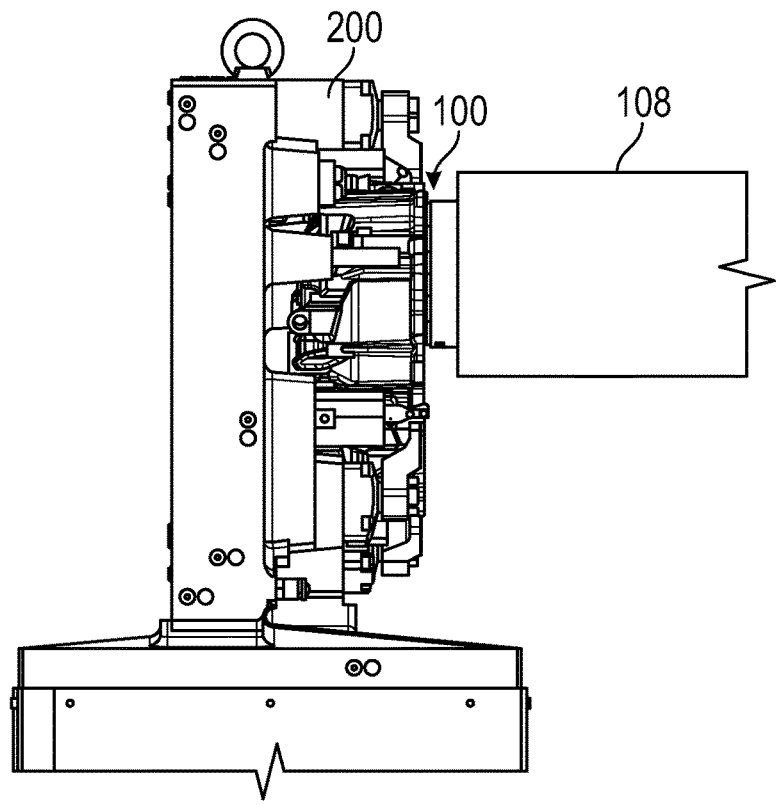
FIG. 8 is a side view of the modular additive manufactured tool assembly of FIG. 1 attached to a machine spindle and performing a boring operation on workpiece.
Figure 9:
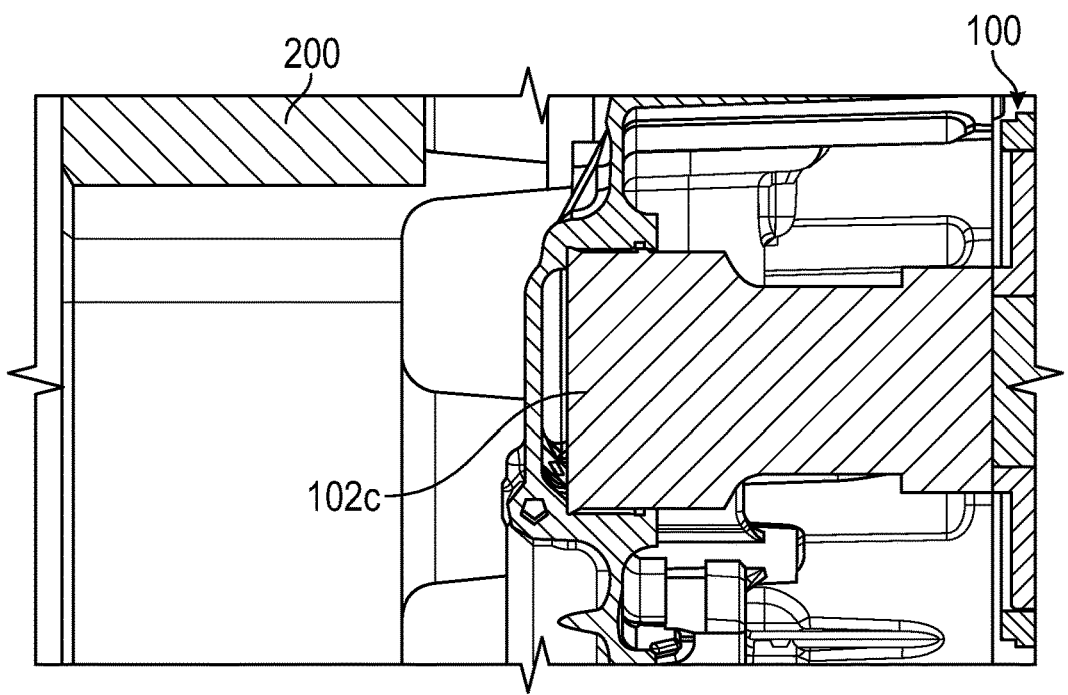
FIG. 9 is an enlarged, cross-sectional side view of the modular additive manufactured tool assembly of FIG. 1 attached to the machine spindle and performing a boring operation on workpiece.

With reference to FIGS. 8 and 9, the perishable tool 102 may be the boring bar 102c. The boring bar 102c is coupled to the tool holder 104, and the tool holder 104 is coupled to the spindle connection 106. The spindle connection 106 is coupled to the machine spindle 108. The boring bar 102c is perishable and made of a polymeric material so that it does not damage the workpiece during the validation of the manufacturing process. Validation entails testing the manufacturing process (e.g., testing the movement of the perishable tool 102) to ensure that the workpiece 200 is machined in accordance with predetermined manufacturing specifications.

Figure 10:
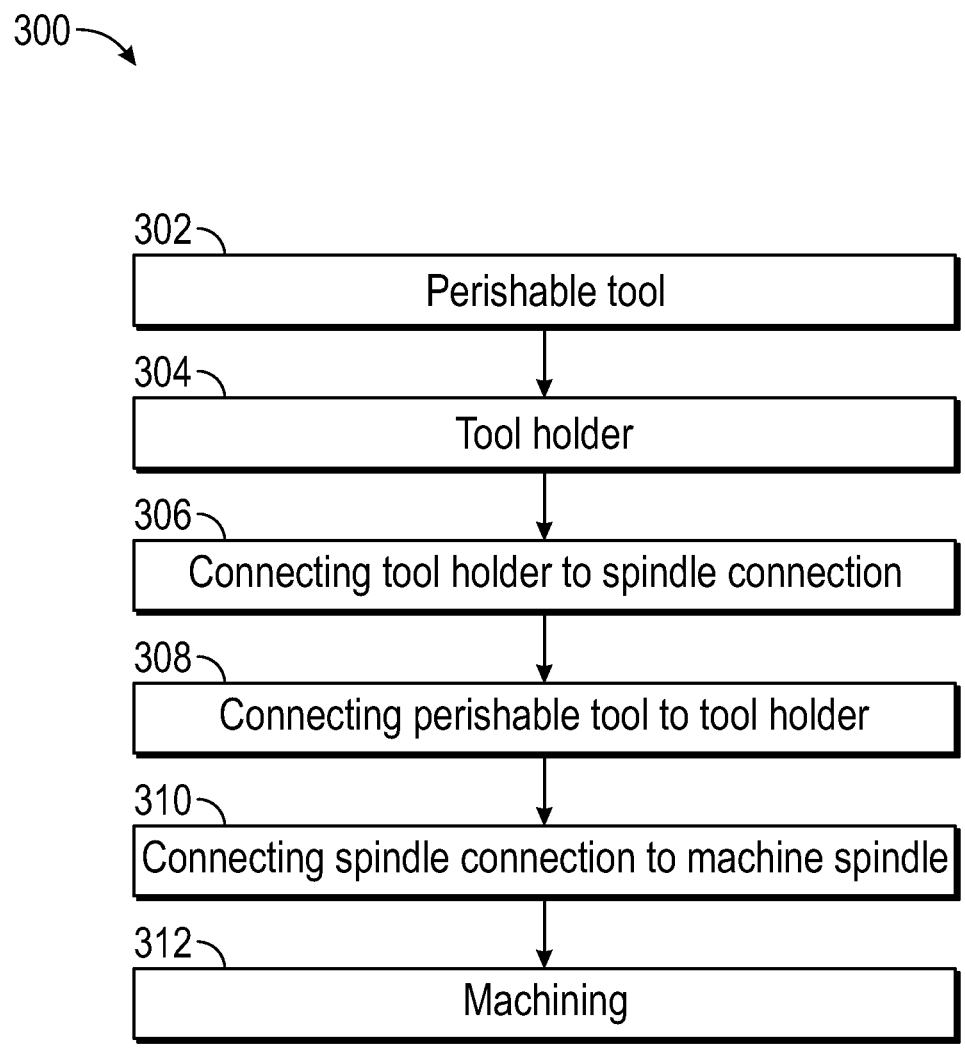
FIG. 10 is a method of validating a predetermined machining plan.

With reference to FIG. 10, the present disclosure also describes a method 300 for validating a predetermined machining plan. While FIG. 10 shows a particular order, the method 300 may be executed in a different order. The method 300 begins at block 302. Block 302 entails manufacturing the perishable tool 102 using an additive manufacturing process, such as 3D printing. The perishable tool 102 is wholly or partly made of a polymeric material or another suitable perishable material. Then, the method 300 proceeds to block 304.

Block 304 entails manufacturing the tool holder 104 using an additive manufacturing process, such as 3D printing. The tool holder 104 is wholly or partly made of a polymeric material or another suitable perishable material. Block 304 may also entail placing the longitudinal support 124 between the spindle connection 106 and the tool holder 104. The longitudinal support 124 may be wholly or partly made of a metallic material, and the perishable material may be wholly or partly a polymeric material. The metallic material forming the longitudinal support 124 has a bending stiffness (i.e., the first bending stiffness) that is greater than the bending stiffness (i.e., the second bending stiffness) of the polymeric material (or other perishable material) forming the tool holder 104 to minimize bending of the tool holder 104. The longitudinal support 124 may be a metallic bar and may be placed inside the reinforcement opening 126 of the tool holder 104. Block 304 also entails placing the radial support 132 around a portion of the outermost holder surface 128 of the tool holder 104 to minimize radial expansion of the tool holder 104 during use. Then, the method 300 proceeds to block 306.

Block 306 includes connecting the tool holder 104 to the spindle connection 106. To do so, the second holder end portion 118 of the tool holder 104 may be inserted in the connection opening 120 of the spindle connection 106. Then, the method 300 proceeds to block 308.

At block 308, the perishable tool 102 is connected to the tool holder 104. To do so, a portion of the perishable tool 102 is inserted in the tool holder opening 138 of the tool holder 104. Then, the method 300 proceeds to block 310.

At block 310, the spindle connection 106 is connected to the machine spindle 108. To do so, attaching features of the machine spindle 108 can be used to connect it to the spindle connection 106. The method 300 then proceeds to block 312.

Block 312 includes validating a predetermined machining plan by machining or simulate machining of the workpiece 200 using the perishable tool 102. At block 312, machining or simulating machining may include boring, drilling, milling, or another suitable machining process. This validating step may entail actual machining the workpiece 200. In this case, the workpiece 200 is wholly or partly made of a material that is softer than the perishable material forming the perishable tool 102. For validation, the user compares the machined workpiece with the manufacturing specification. If the machine workpiece follows the manufacturing specifications, then the machining plan is validated. Otherwise, the machining plan should be revisited. Alternatively, the validating step may entail simulating machining on a workpiece that has already been machined in accordance with the predetermined machine plan. For validation, the user observes whether the perishable tool 102 contacts any part of the already machined workpiece 200. If the perishable tool 102 contacts a part of the already machined workpiece 200, then the machining plan should be revisited. Otherwise, the machining plan is validated.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. A modular additive manufactured tool assembly, comprising:
    a perishable tool, wherein the perishable tool is incapable of machining a metallic workpiece, and the perishable tool is wholly made of a polymeric material;
    a tool holder coupled to the perishable tool, wherein the tool assembly is configured to be coupled to a machine spindle;
    a spindle connection coupled to the tool holder, wherein the spindle connection is configured to be coupled to the machine spindle;
    wherein the tool holder includes a perishable material;
    wherein the tool holder includes a plurality of layers of the perishable material;
    wherein the modular additive manufactured tool assembly includes a longitudinal support coupled between the spindle connection and the tool holder, the longitudinal support includes a metallic material, the metallic material has a first bending stiffness, the perishable material has a second bending stiffness, and the first bending stiffness is greater than the second bending stiffness to minimize bending of the tool holder; and
    wherein the tool holder includes an elongated body, the tool holder defines a reinforcement opening extending through the elongated body, and the longitudinal support is a metallic bar disposed in the reinforcement opening, and the tool holder is wholly made of the polymeric material.

2. The tool assembly of claim 1, wherein the spindle connection includes a connection locating feature, and the tool holder includes a holder locating feature shaped and sized to mate with the connection locating feature.

3. The tool assembly of claim 2, wherein the tool holder defines an outermost holder surface and an innermost holder surface opposite the outermost holder surface, the innermost holder surface defines the reinforcement opening, the tool assembly further comprises a radial support disposed around the tool holder, the radial support is in direct contact with the outermost holder surface, the radial support includes the metallic material, and the radial support is a collar disposed around the tool holder to minimize radial expansion of the tool holder.

4. The tool assembly of claim 3, further comprising at least one fastener coupling the spindle connection to the tool holder.

5. The tool assembly of claim 4, further comprising a cooling nozzle extending through the perishable tool, wherein the cooling nozzle is configured to receive a coolant to review delivery of the coolant through the tool assembly.

6. The tool assembly of claim 5, further comprising at least one bleed hole extending through the spindle connection to adjust flow/pressure distribution of delivery of the coolant.

7. The tool assembly of claim 6, wherein the tool holder includes a first holder end portion and a second holder end portion opposite the first holder end portion, the second holder end portion includes the holder locating feature, and the connection locating feature is a connection opening sized and shaped to receive the second holder end portion.

8. The tool assembly of claim 7, wherein the tool holder includes a tool holder opening extending through the first holder end portion, and the tool holder opening is sized and shaped to receive a portion of the perishable tool to connect the perishable tool to the tool holder.

9. The tool assembly of claim 8, further comprising a flange disposed around the tool holder, wherein the flange directly abuts the spindle connection, the flange is in direct contact with the spindle connection and surrounds the second holder end portion of the tool holder to facilitate connecting the spindle connection to the tool holder.

10. A method of validating a predetermined machining plan, comprising:
    manufacturing a perishable tool using an additive manufacturing process, wherein the perishable tool is incapable of machining a metallic workpiece, and the perishable tool is wholly made of a polymeric material;
    manufacturing a tool holder using the additive manufacturing process, wherein the tool holder is made of a perishable material, and the tool holder includes a plurality of layers of the perishable material;
    connecting the tool holder to a spindle connection;
    connecting the perishable tool to the tool holder;
    connecting the spindle connection to a machine spindle;
    validating a predetermined machining plan using the perishable tool and a workpiece after connecting the perishable tool to the tool holder and after connecting the spindle connection to the machine spindle;
    wherein the perishable tool, the tool holder, and the spindle connection are part of a modular additive manufactured tool assembly, the modular additive manufactured tool assembly includes a longitudinal support coupled between the spindle connection and the tool holder, the longitudinal support includes a metallic material, the metallic material has a first bending stiffness, the perishable material has a second bending stiffness, and the first bending stiffness is greater than the second bending stiffness to minimize bending of the tool holder; and
    wherein the tool holder includes an elongated body, the tool holder defines a reinforcement opening extending through the elongated body, and the longitudinal support is a metallic bar disposed in the reinforcement opening, and the tool holder is wholly made of the polymeric material.

11. The method of claim 10, wherein validating the predetermined machining plan includes machining the workpiece with the perishable tool, and the workpiece is wholly made of a material that is softer than a perishable material forming the perishable tool.

12. The method of claim 10, wherein validating the predetermined machining plan includes simulating machining the workpiece with the perishable tool, wherein the workpiece has already been machined in accordance with the predetermined machine plan, and workpiece is wholly made of a material that is harder than a material forming the perishable tool.

13. The method of claim 10, wherein machining the workpiece includes drilling the workpiece in accordance with the predetermined machining plan.

14. The method of claim 10, further comprising placing a longitudinal support between the spindle connection and the tool holder, wherein the longitudinal support is wholly made of a metallic material, the perishable material is a polymeric material, each of the tool holder and the perishable tool is wholly made of the polymeric material, the metallic material has a first bending stiffness, the perishable material has a second bending stiffness, and the first bending stiffness is greater than the second bending stiffness to minimize bending of the tool holder.

15. The method of claim 14, wherein the tool holder includes an elongated body, the tool holder defines a reinforcement opening, the reinforcement opening extends through the elongated body, placing the longitudinal support between the spindle connection and the tool holder includes placing the longitudinal support in reinforcement opening of the tool holder, and the longitudinal support is a metallic bar.

16. The method of claim 15, further comprising placing a radial support around the tool holder, wherein the tool holder defines an outermost holder surface and an innermost holder surface opposite the outermost holder surface, the innermost holder surface defines the reinforcement opening, the radial support is in direct contact with the outermost holder surface, the radial support is wholly made of the metallic material, and the radial support is a collar configured to be disposed around the tool holder to minimize radial expansion of the tool holder.

17. The method of claim 16, wherein the tool holder includes a first holder end portion and a second holder end portion opposite the first holder end portion, the tool holder includes a tool holder opening extending through the first holder end portion, the tool holder opening is sized and shaped to receive a portion of the perishable tool to connect the perishable tool to the tool holder, and connecting the perishable tool to the tool holder includes inserting the portion of the perishable tool inside the tool holder opening of the first holder end portion to connect the perishable tool to the tool holder.

18. The method of claim 17, wherein connecting the tool holder to the spindle connection includes inserting the second holder end portion in a connection opening of the spindle connection, and the connection opening sized and shaped to receive the second holder end portion to connect the spindle connection to the tool holder.

* * * * *